Oct. 29, 1963　　　D. S. HORNE ETAL　　　3,108,703
GRAIN HANDLING CONVEYORS FOR COMBINES
Filed April 11, 1960　　　　　　　　　　　　6 Sheets-Sheet 5

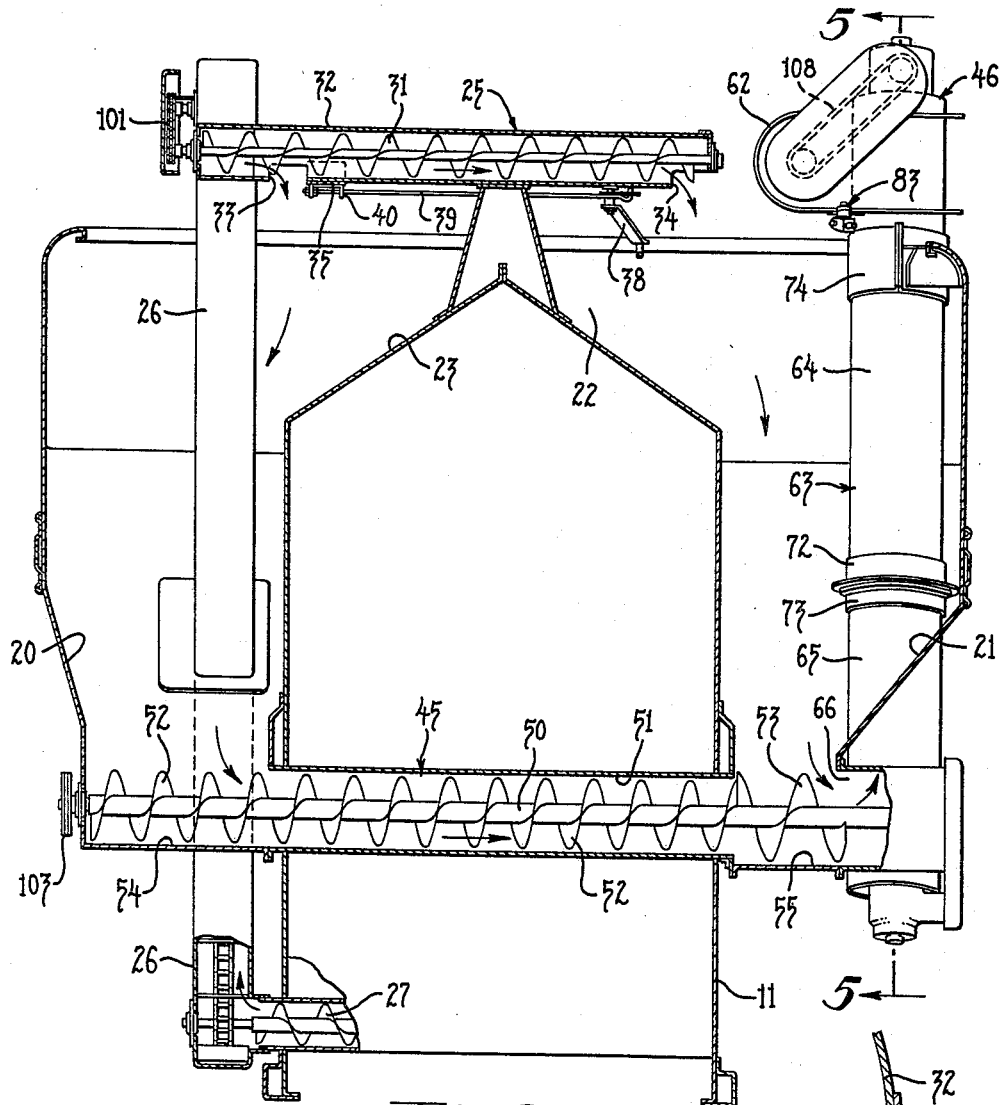
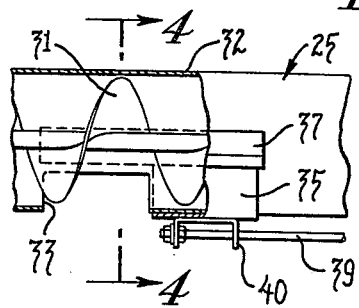
Fig. 2
Fig. 3
Fig. 4
INVENTORS.
DONALD S. HORNE,
BY ROBERT ASHTON &
LESLIE L. KEPKAY.
ATTORNEYS.

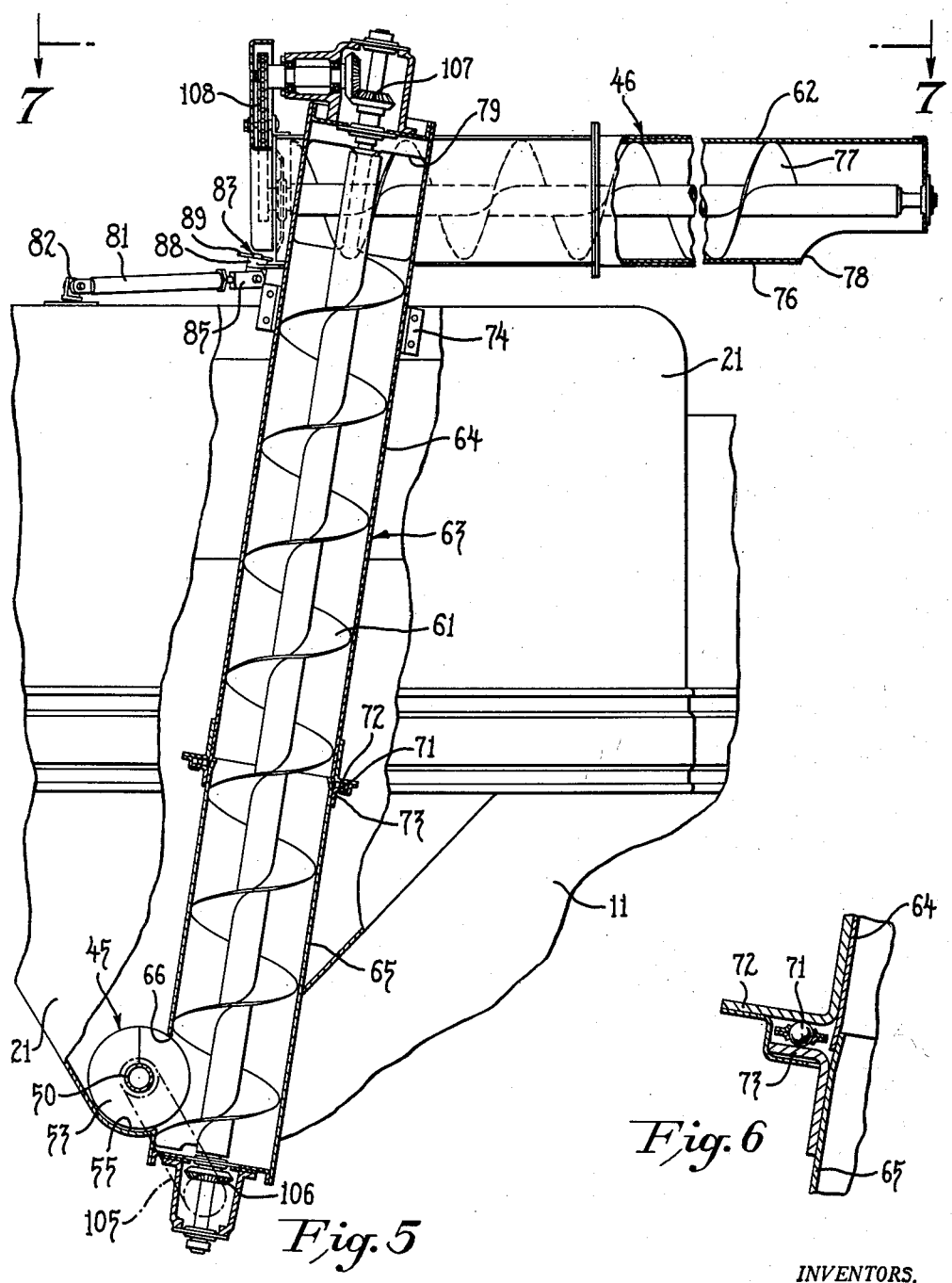

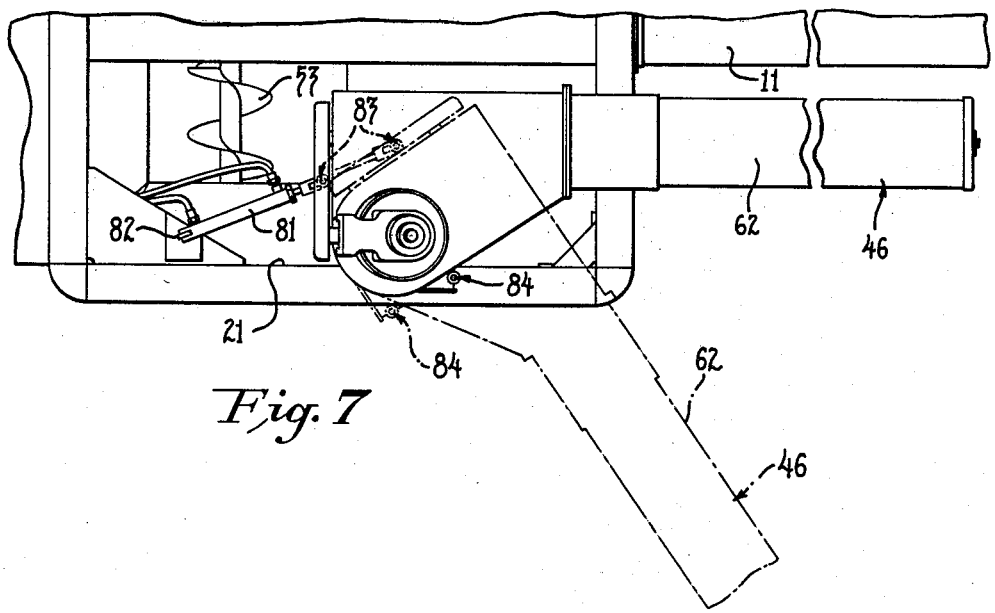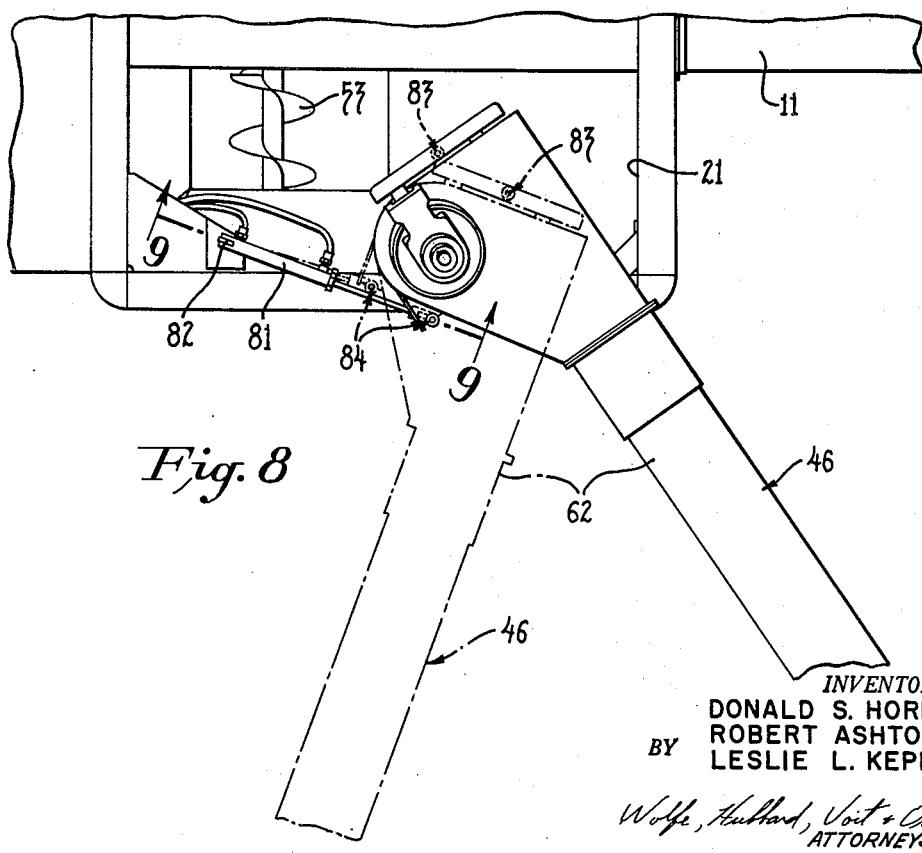

INVENTORS.
DONALD S. HORNE,
BY ROBERT ASHTON &
LESLIE L. KEPKAY.

ATTORNEYS.

Oct. 29, 1963  D. S. HORNE ETAL  3,108,703
GRAIN HANDLING CONVEYORS FOR COMBINES
Filed April 11, 1960  6 Sheets-Sheet 6

INVENTORS.
DONALD S. HORNE,
BY ROBERT ASHTON &
LESLIE L. KEPKAY.

ATTORNEYS.

United States Patent Office 3,108,703
Patented Oct. 29, 1963

3,108,703
GRAIN HANDLING CONVEYORS FOR COMBINES
Donald S. Horne, Robert Ashton, and Leslie L. Kepkay, Toronto, Ontario, Canada, assignors to Massey-Ferguson Limited, Toronto, Ontario, Canada
Filed Apr. 11, 1960, Ser. No. 21,163
3 Claims. (Cl. 214—522)

The present invention relates generally to crop harvesting machines such as self-propelled combines, and concerns more particularly grain handling mechanisms for such machines.

It is one object of the invention to provide a novel grain handling system for loading and unloading side or "saddle" grain tanks on a combine.

In more detail, it is an object to provide a combine with a novel distributing conveyor for selectively distributing grain between two tanks which is simple and economical to manufacture and maintain.

It is a collateral object to provide a combine with a novel transfer conveyor capable of unloading grain from two spaced grain tanks concurrently so that the combine tends to remain in balance during unloading. It is a related object to provide a transfer conveyor as described above that simultaneously unloads spaced grain tanks without forcing grain through one of the tanks so as to cause packing and grain damage.

It is another object of the invention to provide a combine with a novel discharge conveyor which effectively reduces the overall height of the combine.

Further, it is an object to provide a combine discharge conveyor of the above type which permits the grain receiving truck or other receptacle to be positioned close alongside the combine when receiving grain.

Moreover, it is an object to provide a combine discharge conveyor as characterized above having a simple and inexpensive power mechanism for varying the grain discharge point and for holding the conveyor in non-operating, transport position.

Other objects and advantages of the invention will become apparent upon reading the following detailed description and upon reference to the drawings in which:

FIG. 2 is an enlarged transverse section taken approximately along the line 2—2 of FIG. 1;

FIG. 3 is a further enlarged fragmentary section of a portion of the structure appearing in FIG. 2;

FIG. 4 is a fragmentary section taken along the line 4—4 of FIG. 3;

FIG. 5 is a fragmentary section taken along the line 5—5 of FIG. 2;

FIG. 6 is an enlarged fragmentary section of portion of the structure shown in FIG. 5;

FIG. 7 is a fragmentary plan taken along the line 7—7 of FIG. 5;

FIG. 8 is similar to FIG. 7 with the parts shown in an alternate position;

Figure 1:
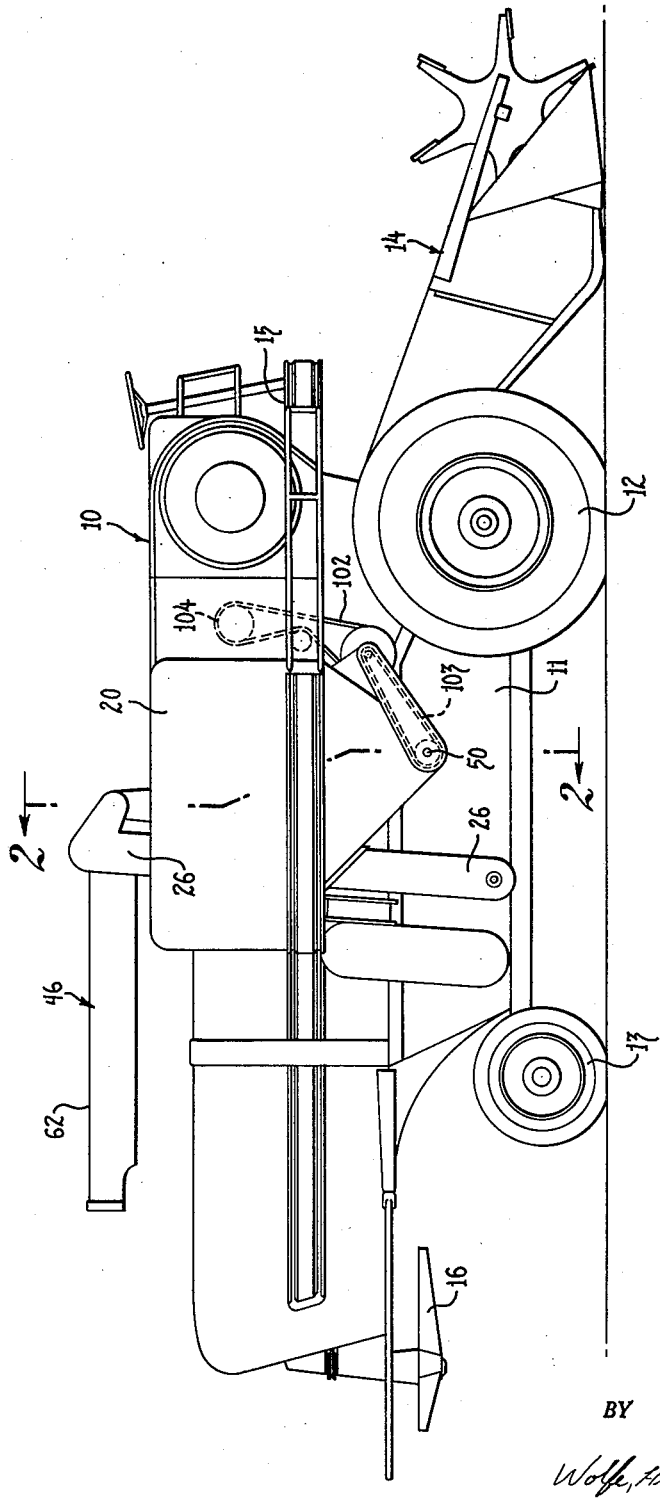
FIGURE 1 is an elevation of a combine embodying the present invention.

While the invention will be described in connection with a preferred embodiment, it will be understood that we do not intend to limit the invention to that embodiment. On the contrary, we intend to cover all alternatives, modifications, and equivalents as may be included within the spirit and scope of the invention as defined by the appended claims.

Turning now to the drawings, there is shown a combine 10 embodying the invention which includes a main body portion 11 supported by front driving wheels 12 and rear steering wheels 13. A grain header assembly 14 is supported at the forward end of the combine and an operator's platform 15 is disposed at the front of the combine so as to overlook the header assembly. The combine body 11 encloses grain threshing and separating mechanisms, and a straw scatterer 16 is journalled at the rear of the combine.

In order to receive and temporarily store the harvested grain, the combine 10 is provided with a side or "saddle" tank construction of the type disclosed and claimed in copending application Serial No. 738,718, filed May 29, 1948. As is described more fully in this application, a saddle tank assembly of this type includes a pair of side tanks 20 and 21 extending down along the opposite sides of the combine body 11 and which are interconnected by a center tank portion 22 lying above an upwardly sloping, or gabled, top 23 of the combine body.

In the preferred embodiment, grain is fed to the tanks 20, 21 and the tank portion 22 by a novel distributing conveyor 25 which selectively distributes the grain between the side or saddle tanks so that the relative loading of each tank can be varied or kept equal. The harvested grain is received by the conveyor 25 from a loading elevator 26 that lifts grain from a cross auger 27 which gathers the grain from the separating mechanisms of the combine.

Pursuant to the invention, the distributing conveyor 25 includes an auger 31 journalled in a channel defined by a tube 32 having discharge openings 33 and 34 one above each side tank 20, 21, and provision is made to vary the size of the opening 33 that is nearest the loading elevator 26. In the preferred embodiment, the size of the opening 33 is varied quite simply and economically by providing the opening with a sliding, arcuate cover 35 having flanged edges 36 which are received in slides 37 secured to the opposite sides of the tube 32 (see FIGS. 3 and 4). The cover 35 can be slid axially of the auger 31 so as to completely close, or completely open, the discharge opening 33.

In order to adjust the position of the cover 35, a bell crank 38 is pivoted to the underside of the tube 32 (see FIG. 2) and a control rod 39 is extended between one arm of the bell crank and a bracket 40 secured to the cover 35. Preferably, the other arm of the bell crank 38 extends forwardly of the combine so that the operator, sitting on the platform 15, can reach behind him and rotate the bell crank to position the cover 35 as desired.

It will, of course, be understood that if the opening 33 is completely closed by the cover 35, then all of the grain moved by the auger 31 will be deposited through the opening 34 into the side tank 21. However, as the opening 33 is uncovered by sliding the cover 35 toward the right in FIG. 2, more and more grain will be dropped through the opening 33 into the side tank 20 and therefore less of the total amount of grain being carried by the distributing conveyor 25 well be moved over to the tank 21. Thus, by positioning the cover 35, the relative amounts of grain deposited in each of the side tanks can be accurately controlled.

By loading the side tanks 20 and 21 evenly, that is, by depositing equal amounts of grain in each of the two tanks, the combine can be kept in lateral balance as the amount of grain temporarily stored in the tanks increases. Alternatively, one or the other of the side tanks 20, 21 can be deliberately loaded to a greater extent than the other tank so that the combine is placed in lateral unbalance. This is often desirable to provide stability for the combine when it is working on sharply sloping ground. Through the lever 38, the operator of the combine is in complete control of the relative loading of the side tanks.

In order to unload the combine grain receiving and storing tanks, a transfer conveyor 45 is provided which feeds grain from the side tanks to a discharge conveyor 46 that deposits the grain wherever desired, for example, in the box 47 of a truck 48 moving alongside the combine. In carrying out the invention, the transfer conveyor feeds grain concurrently from each side tank 20 and 21 without forcing or packing the grain into one of the tanks.

To accomplish this, the conveyor includes an auger shaft 50 journalled within a tubular passage 51 interconnecting the bottoms of the tanks 20, 21. A first auger flight 52 is wound on the shaft 50 so as to extend across the bottom of the tank 20, through the passage 51, and to the bottom of the tank 21. A second auger flight 53 of greater capacity than the flight 52 is wound on the shaft 20 so as to extend from the passage 51, through the bottom of the tank 21, and to the discharge conveyor 46. In the illustrated embodiment, the flight 53 is of a greater diameter than the flight 52 so as to have a greater capacity for moving grain with each revolution of the auger shaft 50. To facilitate the action of the auger flights 52, 53 on the grain, the tank 20 is provided with an arcuate bottom 54 forming a channel for the flight 52, and the tank 21 is provided with an arcuate bottom 55 forming a channel for the auger flight 53.

In operation, it will be appreciated that the auger flight 53 will move more grain than the auger flight 52 and hence the flight 53 will be effective to unload the tank 21 as well as carry forward the grain brought through the passage 51 by the flight 52 from the tank 20. In other words, the varying capacities of the auger flights 52, 53 results in concurrent unloading of each of the side tanks 20 and 21 upon rotation of the auger shaft 50. Since each tank is unloaded at the same time, the lateral balance of the combine is not seriously affected during this operation. Because of the greater capacity of the auger flight 53, the flight 52 cannot pack the grain into the bottom of the tank 21 so as to damage the grain or wedge it in so tightly that the grain tends to "bridge" above the transfer conveyor and thus hinder unloading of the tank 21.

As will be apparent, the term "capacity" as used above in described the auger flights 52 and 53, and as used hereafter in this specification and the attached claims, refers to the amount of grain fed during a given time interval as for example bushels per second.

Figure 11:
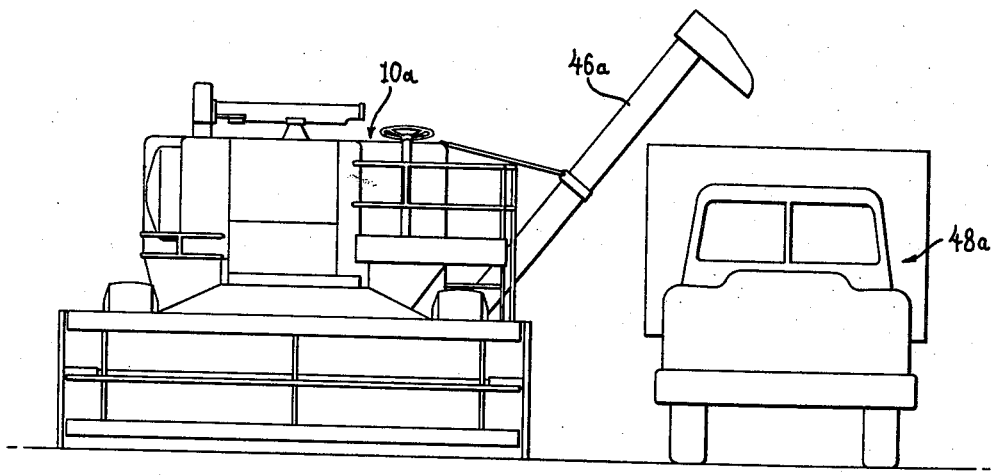
FIG. 11 is a front elevation of a combine having a conventional discharge conveyor shown in relation to a grain receiving truck.
Figure 12:
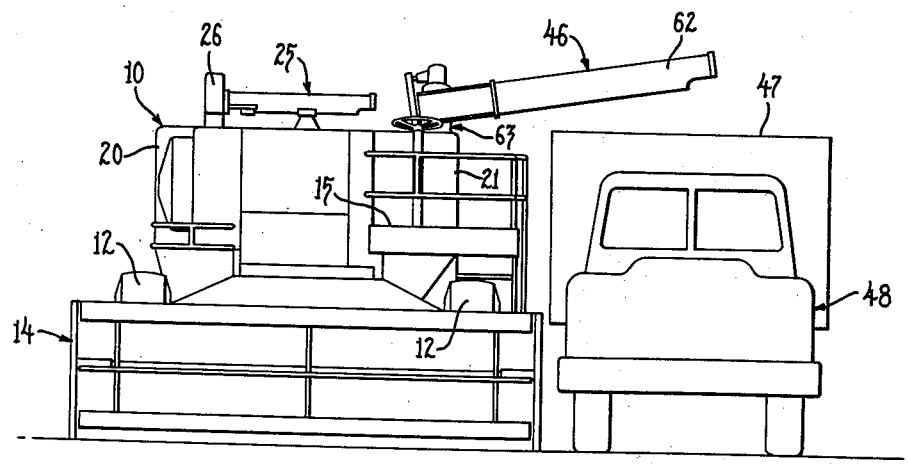
FIG. 12 is a front elevation of the combine shown in FIGS. 1 and 10 shown in grain discharge relation to a grain receiving truck.

Further in accordance with the invention, the discharge conveyor 46 includes a generally vertical elevating auger 61 (see FIG. 5) for raising the grain to the top of the combine, and a generally horizontal conveyor 62 rotatably mounted at the top of the auger 61 so as to be positionable laterally from the side of the combine. As can be seen by comparing FIGS. 11 and 12, the discharge conveyor 46, made up of vertical auger 61 and horizontal conveyor 62, is effective to substantially lower the overall height of the combine 10 as compared to the height of a combine 10a having a conventional type of discharge conveyor 46a. In addition, it will be noted that the discharge conveyor 46 allows the truck 48 to be positioned close alongside of the combine when the grain is unloaded into the box 47 of the truck. This substantially facilitates keeping the combine and truck properly positioned during unloading of the combine and also enables more accurate placement of the grain in the box of the truck. With the conventional discharge conveyor 46a, as illustrated in FIG. 11, the truck 48a must remain at some distance from the combine during the unloading operation.

In order to rotatably mount the horizontal conveyor 62, the elevating auger 61 is journalled in a tubular housing 63 having upper and lower portions 64 and 65 respectively, with the lower portion having an opening 66 to receive grain from the transfer conveyor 45 and the upper portion being mounted on the lower portion for rotation about their axis. The horizontal conveyor 62 is carried by the upper portion 64 of the housing 63, and hence the conveyor 62 rotates with the rotatably mounted upper portion.

In the preferred embodiment, the rotatable mounting of the upper portion 64 on the lower portion 65 includes a thrust bearing 71 interposed between flanges 72 and 73 secured to the upper and lower portions 64, 65 respectively (see FIG. 6). In addition, a circular strap 74 is secured to the upper edge of the tank 21 and loosely surrounds the upper portion 64 of the tubular housing. It can thus be seen that the thrust bearing 71 carries the weight of the upper portion 64 and the horizontal conveyor 62 and allows the upper portion to turn smoothly within the strap 74.

In the preferred embodiment, the horizontal conveyor 62 includes a member 76 defining a channel within which is journaled an auger 77. A discharge opening 78 is formed in the outer end of the member 76, and an opening 79 is provided between the upper portion 64 of the tubular housing 63 and the member 76 so that grain may be passed from the elevating auger 61 to the horizontal conveyor auger 77.

To permit high capacity operation of the grain unloading augers, the capacity of the elevating auger 61 is greater than the capacity of the auger flight 53, and the capacity of the horizontal conveyor auger 77 is greater than the capacity of the auger 61. Thus, each time the grain is passed from one conveyor means to another during unloading, the grain feed rate potential is increased and, as a result, there is no packing or jamming at the transfer points even though the whole system is operated at a high rate of feed.

As observed above, "capacity" in this description means the bushels per second potential of an auger conveyor, and it will be appreciated that the capacity of an auger can be increased by increasing the rotational speed of the auger, or increasing the size of the auger, or increasing the pitch of the auger flights. In the illustrated embodiment, the auger 61 is of greater diameter than the flight 53 so as to obtain the desired capacity jump, and the auger 77 is driven at greater speed than the auger 61 so as to obtain the desired capacity jump. Alternatively, of course, the other variables could be altered to change capacities without departing from the invention.

For adjustably positioning the horizontal conveyor 62, a hydraulic actuator 81 is pivoted at 82 to the top of the grain tank structure and is adapted to be secured at either connection point 83 or connection point 84 to the horizontal conveyor 62. The actuator 81 is of the double acting type and when it is coupled at point 83 (see FIG. 7), the actuator is effective for swinging the horizontal conveyor 62 from the dashed-line position to the solid-line, transport position in which the conveyor lies close against the side of the combine body 11. When the actuator 81 is coupled at point 84 to the horizontal conveyor 62 (see FIG. 8), the actuator is effective for swinging the conveyor through its range of unloading positions and for holding the conveyor in any desired position within this range.

Figure 9:
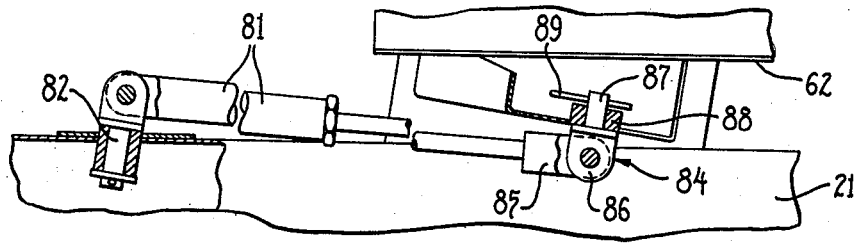
FIG. 9 is an enlarged fragmentary section taken along the line 9—9 of FIG. 8.
Figure 10:
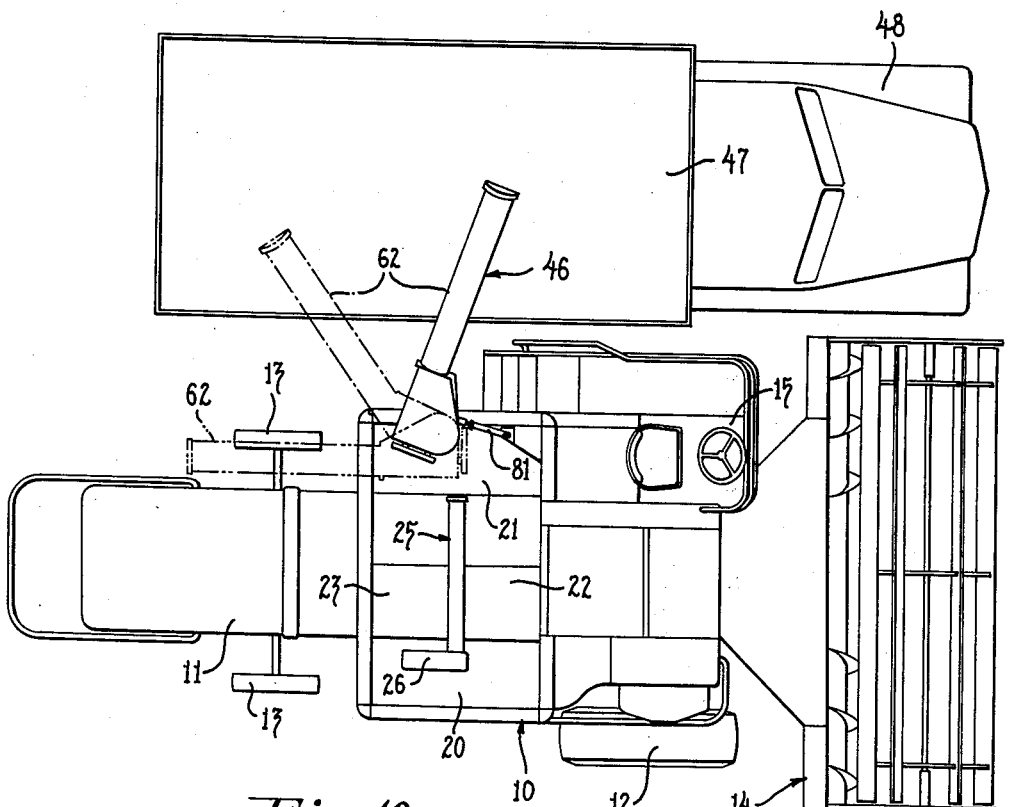
FIG. 10 is a plan view of the combine shown in FIG. 1 together with a grain receiving truck.

In order to conveniently lock the actuator 81 at either point 83 or 84, the outer end 85 of the actuator 81 carries a pivoted member 86 having a pin 87 adapted to be received within an annular member 88 at connection point 84 (see FIG. 9) or, alternatively, within a similar annular member at point 83. The pin 87 is retained within the desired one of the annular members by locking clip 89 which passes through an aperture at the end of the pin. It will thus be apparent that the actuator 81 can be released from the horizontal conveyor 62 by simply pulling the clip 89 from the pin 87 and allowing the pin to drop free from the connection point. By making the easily accomplished change between the connection points 83, 84, the single actuator 81 is able to both position the horizontal conveyor 62 through its range of discharge positions and to swing and hold the conveyor in transport position.

If it is desired to avoid the use of the actuator 81 for positioning the horizontal conveyor 62, it will be obvious that the conveyor can be positioned manually. The thrust bearing 71 and the strap 74 make the conveyor 62 easily positionable without a power aid.

In order to power the distributing conveyor 25, a chain and sprocket connection 101 is provided coupling the upper end of the loading elevator 26 with the auger 31 (see FIG. 2). For driving the transfer and discharge augers, belts 102 and 103 are provided rotatably coupling the auger shaft 50 with a pulley 104 on the main drive shaft of the combine (see FIGS. 1 and 2). The auger shaft 50 is coupled by a chain 105 and bevel gears 106 (see FIG. 5) to the auger 61, and bevel gears 107 and chain 108 couple the augers 61 and 77. It can thus be seen that power supplied to the transfer conveyor 45 also drives the discharge conveyor 46. It will also be observed that the horizontal conveyor 62, together with the upper portion 64 of the housing 63, can be freely swung on the thrust bearing 71 without interfering with the drive for the horizontal conveyor.

We claim as our invention:

1. In a combine having two spaced grain receiving tanks, a distributing conveyor for selectively feeding grain to said tanks comprising, in combination, means defining a channel extending above each of said tanks, a loading conveyor for supplying grain to one end of said channel, conveying means in said channel for moving grain from said one end along said channel to its opposite end, said channel having a pair of discharge openings in its bottom one above each of said tanks, and means for selectively varying the size of the discharge opening that is closest to said one end so that varying amounts of grain drop therethrough and thus the relative amounts of grain delivered to said tanks are varied.

2. In a combine having two spaced grain receiving tanks, a distributing conveyor for selectively feeding grain to said tanks comprising, in combination, a tube defining a channel extending above each of said tanks, a loading conveyor for supplying grain to one end of said tube, an auger journalled in said channel for moving grain from said one end along said channel to its opposite end, said channel having a pair of discharge openings in its bottom one above each of said tanks, and a curved panel movably mounted on said tube adjacent the discharge opening that is closest to said one end, said panel being selectively positionable to form a continuation of said tube across the adjacent discharge opening whereby varying amounts of grain drop therethrough and thus the relative amounts of grain delivered to said tanks are varied.

3. A combine comprising, in combination, a wheeled frame, a pair of grain storage tanks placed one on either side of said frame, a passage extending through said frame and connecting both of said tanks, a first auger journalled in said passage for feeding grain from one tank to the other, a generally vertical duct positioned in one of said tanks and opening adjacent the discharge end of said auger, said first auger having a portion extending in said one tank from said passage to said vertical duct with said portion having a greater feed rate than the remainder of the auger, a second auger journalled along said generally vertical duct having a greater feed rate than said first auger portion, a generally horizontal duct positioned at the top of said generally vertical duct just above said tanks and frame, and a third auger journaled in said generally horizontal duct having a greater feed rate than said second auger, said generally horizontal duct being supported for movement in a generally horizontal plane so as to be swingable out over a grain receiving unit which may be positioned close alongside said combine.

References Cited in the file of this patent

UNITED STATES PATENTS

| | | |
|---|---|---|
| 275,153 | Craik | Apr. 3, 1883 |
| 2,015,954 | Mitchell | Oct. 1, 1935 |
| 2,022,166 | Welty | Nov. 26, 1935 |
| 2,357,220 | Olson | Aug. 29, 1944 |
| 2,479,899 | Beyer | Aug. 23, 1949 |
| 2,783,906 | Helms | Mar. 5, 1957 |
| 2,883,076 | Palmer | Apr. 21, 1959 |